(12) United States Patent
Manolescu et al.

(10) Patent No.: US 9,892,103 B2
(45) Date of Patent: Feb. 13, 2018

(54) SOCIAL MEDIA GUIDED AUTHORING

(75) Inventors: Dragos Manolescu, Kirkland, WA (US); Matthew F. Hurst, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1506 days.

(21) Appl. No.: 12/193,148

(22) Filed: Aug. 18, 2008

(65) Prior Publication Data

US 2010/0042910 A1    Feb. 18, 2010

(51) Int. Cl.
| G06F 17/00 | (2006.01) |
| G06F 17/24 | (2006.01) |
| G06F 17/30 | (2006.01) |
| G06Q 10/10 | (2012.01) |

(52) U.S. Cl.
CPC ...... *G06F 17/241* (2013.01); *G06F 17/30867* (2013.01); *G06Q 10/10* (2013.01)

(58) Field of Classification Search
CPC .............................. H04L 51/32; G06Q 50/01
USPC ........................................ 715/200, 202, 255
See application file for complete search history.

(56) References Cited

U.S. PATENT DOCUMENTS

| 6,460,036 | B1 | 10/2002 | Herz | |
| 6,654,725 | B1 | 11/2003 | Langheinrich et al. | |
| 7,069,308 | B2 | 6/2006 | Abrams | |
| 7,188,153 | B2 | 3/2007 | Lunt et al. | |
| 7,249,123 | B2 * | 7/2007 | Elder et al. | |
| 7,296,223 | B2 * | 11/2007 | Chidlovskii et al. | ......... 715/234 |
| 7,366,759 | B2 | 4/2008 | Trevithick et al. | |
| 7,437,709 | B2 * | 10/2008 | Salter | ............. 717/112 |
| 7,478,078 | B2 * | 1/2009 | Lunt et al. | |
| 7,526,459 | B2 * | 4/2009 | Flinn et al. | ...................... 706/12 |
| 7,577,244 | B2 | 8/2009 | Taschereau | |
| 7,672,953 | B2 * | 3/2010 | McAniff et al. | .............. 707/770 |
| 7,685,198 | B2 * | 3/2010 | Xu et al. | ........................ 707/748 |
| 7,797,274 | B2 * | 9/2010 | Strathearn et al. | ........... 707/609 |

(Continued)

FOREIGN PATENT DOCUMENTS

| WO | WO 2008/000046 A1 | 1/2008 |
| WO | WO 2008/057288 A2 | 5/2008 |

OTHER PUBLICATIONS

U.S. Appl. No. 12/184,254, filed Aug. 1, 2008, Manolescu et al.

(Continued)

*Primary Examiner* — Manglesh M Patel

(57) ABSTRACT

Techniques and systems for assisting an author in creating content for social media (e.g., blog posts, microblogs, tweets, etc.) are disclosed, wherein hints are provided to the author as a function of social media stored in a social media knowledge store. Social media is collected and stored in a social media knowledge store according to some criteria. Upon the happening of some predetermined event, for example, relevant information is retrieved from the social media knowledge store. The relevancy of information may be a function of editing context (provided by the author) and/or social media behavior, for example. The relevant information may be translated into hints that provide an author with suggestions and/or corrections, for example. This information is provided to the author through a social media environment (e.g., an authoring tool) that may be also be capable of receiving input from the author and outputting editing context.

20 Claims, 5 Drawing Sheets

(56) References Cited

U.S. PATENT DOCUMENTS

| | | | |
|---|---|---|---|
| 7,801,879 B2 | 9/2010 | Jones | |
| 7,827,165 B2* | 11/2010 | Abernethy et al. | 707/708 |
| 7,921,156 B1* | 4/2011 | Stolorz et al. | 709/203 |
| 8,086,504 B1* | 12/2011 | Dicker et al. | 705/27.1 |
| 8,572,094 B2* | 10/2013 | Luo et al. | 707/748 |
| 2003/0196171 A1 | 10/2003 | Distefano, III | |
| 2004/0122803 A1 | 6/2004 | Dom et al. | |
| 2005/0021397 A1 | 1/2005 | Cui et al. | |
| 2005/0099398 A1* | 5/2005 | Garside et al. | 345/173 |
| 2005/0159970 A1 | 7/2005 | Buyukkokten et al. | |
| 2005/0209999 A1* | 9/2005 | Jou | 707/2 |
| 2005/0267940 A1* | 12/2005 | Galbreath et al. | 709/206 |
| 2005/0278613 A1* | 12/2005 | Morinaga et al. | 715/500 |
| 2006/0004789 A1* | 1/2006 | Lunt et al. | 707/100 |
| 2006/0041536 A1 | 2/2006 | Scholl et al. | |
| 2007/0150603 A1 | 6/2007 | Crull et al. | |
| 2007/0208751 A1 | 9/2007 | Cowan et al. | |
| 2007/0214097 A1 | 9/2007 | Parsons et al. | |
| 2007/0239452 A1 | 10/2007 | Madhavan et al. | |
| 2007/0239788 A1* | 10/2007 | Cunningham et al. | 707/104.1 |
| 2007/0245245 A1 | 10/2007 | Blue et al. | |
| 2007/0255831 A1 | 11/2007 | Hayashi et al. | |
| 2007/0276728 A1 | 11/2007 | Bala | |
| 2007/0282680 A1 | 12/2007 | Davis et al. | |
| 2008/0005073 A1 | 1/2008 | Meek et al. | |
| 2008/0005282 A1 | 1/2008 | Gaedcke | |
| 2008/0052343 A1 | 2/2008 | Wood | |
| 2008/0065701 A1 | 3/2008 | Lindstrom et al. | |
| 2008/0071647 A1 | 3/2008 | McQueen et al. | |
| 2008/0086459 A1 | 4/2008 | Ryan | |
| 2008/0091634 A1 | 4/2008 | Seeman | |
| 2008/0103907 A1 | 5/2008 | Maislos et al. | |
| 2008/0104172 A1* | 5/2008 | Craig | 709/204 |
| 2008/0134052 A1 | 6/2008 | Davis et al. | |
| 2008/0189292 A1* | 8/2008 | Stremel et al. | 707/10 |
| 2008/0215607 A1* | 9/2008 | Kaushansky et al. | 707/102 |
| 2008/0228749 A1* | 9/2008 | Brown | 707/5 |
| 2008/0228768 A1* | 9/2008 | Kenedy et al. | 707/6 |
| 2008/0263053 A1* | 10/2008 | Hull | 707/10 |
| 2009/0063995 A1* | 3/2009 | Baron et al. | 715/753 |
| 2009/0119173 A1 | 5/2009 | Parsons et al. | |
| 2009/0254817 A1* | 10/2009 | Dreyfus et al. | 715/257 |
| 2009/0281988 A1 | 11/2009 | Yoo | |
| 2009/0292526 A1 | 11/2009 | Harari et al. | |
| 2014/0040371 A1* | 2/2014 | Gurevich | H04L 61/609 709/204 |

OTHER PUBLICATIONS

U.S. Appl. No. 12/200,936, filed Aug. 29, 2008, Manolescu et al.

Chau, et al.,"Parallel Crawling for Online Social Networks", Retrieved at << http://www2007.org/posters1057.pdf>>, pp. 1283-1284.

Heer, "Exploring Enron Visualizing ANLP Results", Retrieved at << http://jheer.org/enron/v1 >>, Jun. 6, 2008, pp. 11.

Kangas et al., "Ads by Google" and other Social Media Business Models, Espoo 2007. VTT Tiedotteita—Research Notes 2384, 64 pages.

Langheinrich et al., "Unintrusive Customization Techniques for Web Advertising", Computer Networks: The International Journal of Computer and Telecommunications Networking, vol. 31, Issue 11-16 (May 1999), 17 pages.

"Tools Overview" http://www.blogpulse.com/tools.html.

"User Generated Content, Social Media, and Advertising—An Overview", Apr. 2008, 17 pages.

"Wink, the Social Network Search Engine launched", Retrieved at << http://www.techshout.com/internet/2006/17/wink-the-social-network-search-engine-launched/ >>, Jun. 6, 2008, pp. 3.

"Web Authoring and Editing Tools and other Stuff", http://www.canadiansocialresearch.net/webkmrk.htm, obtained online May 26, 2008, updated Mar. 31, 2008, 8 pgs.

"Authoring Tool Creates Rich Media and Video Advertising", http://findarticles.com/p/articles/mi_m0PIL/is_2008_Feb_22/ai_n24320389, obtained online May 26, 2008, 2008, 5 pgs.

"Social Network Management System", http://www.rmdstudio.com/social-media/social-network-management-system-development.html, obtained online May 26, 2008, Jan. 4, 2008, 4 pgs.

"ThisNext.Com Launches New Content Creation Tool for Blogs and Social Networks", obtained online May 26, 2008, http://goliath.ecnext.com/coms2/gi_0199-6332929/ThisNext-com-Launches-New-Content.html, 2008, 2 pgs.

"WriteToMyBlog", http://writetomyblog.com/, obtained online on May 26, 2008, 2006, 1 page.

* cited by examiner

SOCIAL MEDIA GUIDED AUTHORING

BACKGROUND

The influence of social media is on the rise, from individuals to businesses to political campaigns. Social media authoring tools are helping to facilitate the rise by increasing the ease with which content is written and published online. As direct descendants of traditional desktop-publishing tools, social media authoring tools help authors in various ways. For example, they provide facilities that assist with formatting text, such as bold, italics, underlining, and lists. Likewise, they have built-in spell checkers that utilize a dictionary to verify the spelling of typed text.

Given their ancestry, none of these features and components leverages social media to assist in the content creation process. Instead, they rely on mechanisms similar to those used in desktop-publishing tools, such as predefined grammar rules or a standard dictionary. Additionally, social media authoring tools do not provide the author with other useful information that may be leveraged from social media, such as the inferred demographics of the author's readers or what is of particular interests to the author's readers.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more techniques are disclosed for assisting an author in creating content for social media (e.g., blogs, weblogs, usenet, microblogs, message board forums, etc.). The techniques may be incorporated into a pre-existing program, system, and/or some other social media authoring tool that helps social media authors publish content online. Alternatively, or in addition, the techniques may be part of one or more authoring tools that are built from the ground up (e.g., part of an initial version of an authoring tool). For example, the techniques may be an add-on or plug-in that can be connected to a commonly used publishing tool, similar to a word processor, that assist the author in publishing the content on a particular website. The techniques may also act independently of existing social media mechanisms (e.g., initially being part of a new and distinct program).

Upon some predetermined event (e.g., the author starting a social media authoring tool program, typing a term in a search field, creating some content, etc.) relevant information may be retrieved from a social media knowledge store. Relevancy may be determined by a multitude of criteria including such things as the authors previously posted content, the author's readership (e.g., comprising those who read the author's blog), a search term the author inputted, and/or a keyword in the content the author is creating. In one example, raw data is collected from social media, sorted according to some predetermined criteria, and stored in the social media knowledge store, wherein relevant information pertaining to the author and/or the content the author is creating may be retrieved.

Once the relevant information has been extracted, it is translated into hints (e.g., a pop-up box, visual cues, etc.). These hints may provide a more user friendly means of displaying the relevant information, for example. Additionally, the hints may be a translation of inferences made about the relevant information. For example, the relevant information extracted may comprise previously created blog posts by the author and comments relating to those previously created blog post that were made by readers. In this example, the hints may provide the author with information about which topics elicit more responses from his/her readers, and the emotional charge associated with them, based on inferences made from the language of the previously created posts and their respective comments.

The hints are provided to the author to assist the author in creating social media content. For example, if the author desires to cover a topic that is likely to trigger strong reactions from his/her readers, the author may use the hints to determine what language, topics, links/references, images, quotes, and/or other types of content and relationships have caused more emotional responses amongst the viewership and use similar language and/or topics in social media content the author is currently creating.

The techniques disclosed herein enhance the present social media authoring tools by leveraging social media. It augments the authoring experience, for example, with insight and cues inferred from the existing corpus of social media. It also increases the value an author brings to the social media community he/she is a part of by showing the author what content already exists and suggesting topics that the author may want to write about that cater to his/her readers but also is unlike content that already exists.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
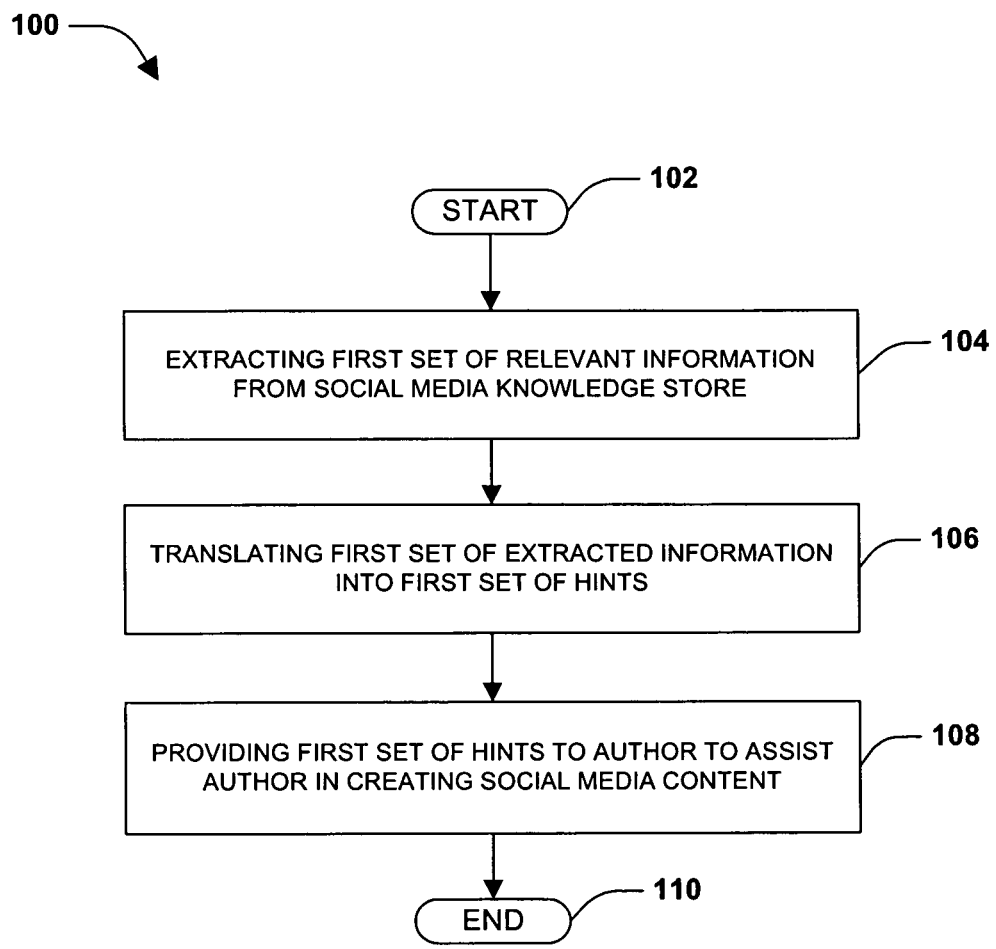
FIG. 1 is a flow chart illustrating an exemplary method for assisting an author in creating content for social media.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Turning initially to FIG. 1, an exemplary methodology 100 is illustrated for assisting an author in creating content for social media. The example method 100 begins at 102, and a first set of relevant information is extracted from a social media knowledge store, at 104. It will be appreciated that the term "social media" is used in a broad sense herein to describe or comprise, among other things, blogs, microblogs, and message board forums. A social media knowledge store may comprise raw data (e.g., the text of previously posted posts, inferences made about the previously posted posts, etc.) and/or data wherein knowledge and/or facts have been added.

In one example, raw data is acquired by monitoring ping servers used in social media and crawling feeds in response to ping events. For social media that does not provide regular pings, scheduled crawling may be performed. Partial feeds may be augmented with an intelligent scraping mechanism, for example, which parses the structure of the permalink page (e.g., the page containing the post), extracting the complete content of the post. From this raw data (e.g. the post), inferences may be made about the post using rules and algorithms that can be trained. For example, the algorithms may detect what topics are covered by a post according to keywords in the post and/or links extracted from the post. Natural language processing algorithms may also be used to infer the sentiment of the author regarding a topic in the post, to infer the demographics of the author of the post, etc. These inferences may be stored in the social media knowledge store.

A first set of relevant information, from the data in the social media knowledge store, may be extracted upon the happening of some event (e.g., a program opening, an author starting a new blog post, an author entering text, etc.). It will be appreciated that the relevant information extracted from the knowledge store may include posts, inferences made about posts, etc. Data stored in the social media knowledge store may be determined to be more relevant, and therefore extracted, based upon an author's input (e.g., editing context) and/or behaviors in social media. That is, as an author creates content, different data stored in the social media knowledge store may become more or less relevant based upon this "editing context". Similarly, some data stored in the social media knowledge store may become more or less relevant based upon what is going on in social media. For example, at any given point in time (e.g., snapshot), some topics may be very relevant (e.g., a presidential election), whereas others may be less relevant (e.g., an old news story about safety related product recalls). It will be appreciated that relevant information can be determined based upon the editing context, behaviors in social media or both. Relevancy based merely upon social media behaviors (but not the editing context) may be useful for example, before the author creates any content. For example, the first time an author sits down to create content, it may be useful to provide the author with a list of hot topics. These would be based upon behaviors in social media, but not the editing context (since the author has not yet generated any content). After the author has generated some content, however, the determination of relevancy may by adapted based upon this editing context. It can thus be appreciated that "pushing" data from the social media knowledge store can be beneficial (at least initially) as compared to merely "pulling" data from the store (e.g., by querying the store based upon the author's editing context and/or other direction from another mechanism, such as a social media environment).

In one embodiment, an author's input is filtered into terms that are capable of being used in a query of the social media knowledge store. For example, if the author types the phrase "hurricanes are predicted to cause severe damage to Florida this year" into an authoring tool, the phrase may be filtered to contain the terms "hurricane, predict, severe damage, Florida, this year" and topics that match that query and/or posts that contain those terms may be extracted as being more relevant. In another example, relevant information is extracted when an authoring tool opens, wherein the relevant information is a function of current popular topics in social media (e.g., topics being commonly written about at the time). Those of ordinary skill in the art will appreciate that many other forms of author input and/or behaviors in social media may be used to determine what is relevant. For example, an author may highlight a word or a group of words and information relating to those words may be extracted. Additionally, content posted in social media that has had a higher viewership in the last day, relative to the viewership of other content, may be extracted before author input is received.

At 106, the first set of relevant information extracted at 104 is translated into a first set of hints. The hints may provide context to the relevant information that has been extracted. For example, the hints may suggest: other sites that the author should link to; topics that the author should also include, or avoid; people/places that, when covered by social media content on the same topic, are received positively by the readership; and/or the approximate demographics of people participating in conversations about the topic.

At 108, the first set of hints is provided to the author to assist him/her in creating social media content. For example, the hints may be displayed in a pop-up box and/or displayed using some other sort of visual cue, such as an underlined term that may be focused on by the author (e.g., wherein the hint may be displayed when the author focuses on the term). Additionally, the author may select the hint and additional information about the hint (e.g., such as an explanation regarding the hint) may be displayed and/or the hint may be inserted into the content the author is creating. For example, the hint may relate to a term that is commonly used in social media rather than the term entered by the author, and the hinted-to term may replace the term entered by the author. It will be appreciated that this is different than a dictionary and/or a thesaurus, because it relies on social media, rather than a predetermined list of words, to provide the author with feedback. The exemplary method 100 ends at 110.

In one embodiment of method 100, the author inserts a reference URL into the content he/she is creating and the relevant information extracted includes posts in social media that contain the same URL and/or a similar reference (e.g., a different URL containing the similar subject matter). It will be understood in the art that a page pointed to by a URL may be extracted and analyzed using algorithms that detect keywords in the page. Additionally, similar references may also be detected as a function of keywords in the posts that cite the different URL (e.g., it is inferred that the URL is to a page relating to the keywords). Once this information is extracted, hints may provide the author with more salient references. For example, the hints may provide the author with other similar references that are receiving more attention (e.g. being cited more) in social media than the URL referenced in content the author is creating. This type of hint may, for example, allow the author to read the pages pointed to by the similar URLs and change the URL he/she references and/or the content the author is creating. In another example, the hints may provide the author with similar references that provide good comparative subject matter. The author may view the similar references and include content that tries to persuade his/her readers why those references should be ignored or are wrong, for example.

In another embodiment of method 100, similar to the previous embodiment, the relevant information extracted includes posts in social media that contain the same reference as the author is citing in his/her content and/or a similar reference. However, in this embodiment, the hints provide the author with URL metrics (e.g., by aggregating statistics of the posts). For example, the relevant information may be used to calculate the emotional charge of subject matter pointed to by the reference as a function of terms surrounding the references in the posts that contain the same reference and/or a similar reference. This may assist the author in determining whether or not to include the reference and/or what type of responses the author should expect to receive once the post is posted. In another example, the demographics of authors that have cited the same or similar reference are provided to the author creating the content. Using this information, for example, the author may be able to infer that most people that are commenting about this topic are 55-65 years old, so it is likely that readers 55-65 will be more interested in reading about the topic than, for example, 25-35 year olds. Therefore, if the author is trying to target a younger audience, the author may not want to include the reference and/or may want to change the topic of his/her post.

In yet another embodiment of method 100, the relevant information extracted includes posts in social media, written by the author creating the post and other authors, that contain a term and/or phrase input by the author creating the post, and also includes the responses to those posts. In this embodiment, the input may include highlighting a term/phrase that the author has already written in the post and/or may include entering the term/phrase into a search field. From this information, term/phrase analytics may be calculated and provided to the author in hints. For example, the hints may indicate the emotional charge of the term as a function of responses received when the author has used that term in the past. In another example, the hints may provide the author with other terms/phrases that are associated (e.g., highly correlated) with that term. The author may, for example, select one of the associated terms to replace the term being used if the author wishes to generate more or less emotional charge from his/her readership.

In another embodiment of method 100, hints are provided to the author before the author has created any content. In this case, the relevant information extracted may be a function of social media and/or content the author has previously posted in social media (if the author has created post before). If the author has previously posted content in social media, hints may provide, for example, the author with information about the previous post, such as the demographics of his/her readers (as a function of responses received), topics that generate more emotional charge among his/her readers, etc. If previous posts from the author are not extracted and/or the author has not posted content in social media before, hints may suggest topics that the author may want to create content about, for example, if the author wishes to target a specific audience. Additionally, the hints may indicate to the author what topics are more popular in the last 24 hours, for example, relative to other topics in social media.

It will be appreciated that the relevant information, translated and provided to the author, may change as a result of author input, for example. For instance, if the first set of relevant information was a function of a first selected term in the content being created, and the author selects a different term, a second set of relevant information may be extracted (e.g., providing different hints). Additionally, hints may be altered at predetermined time intervals (e.g., every five minutes), at predetermined events (e.g., when an author selects a "hint" button), and/or continuously. Providing hints at predetermined intervals and/or predetermined events, for example, may be more practical (as compared to providing hints continuously) for web-based social media authoring tools. It will also be appreciated that the type of hints provided to the author may vary according to the information extracted from social media and/or the amount of reactions in social media generated by the content.

Figure 2:
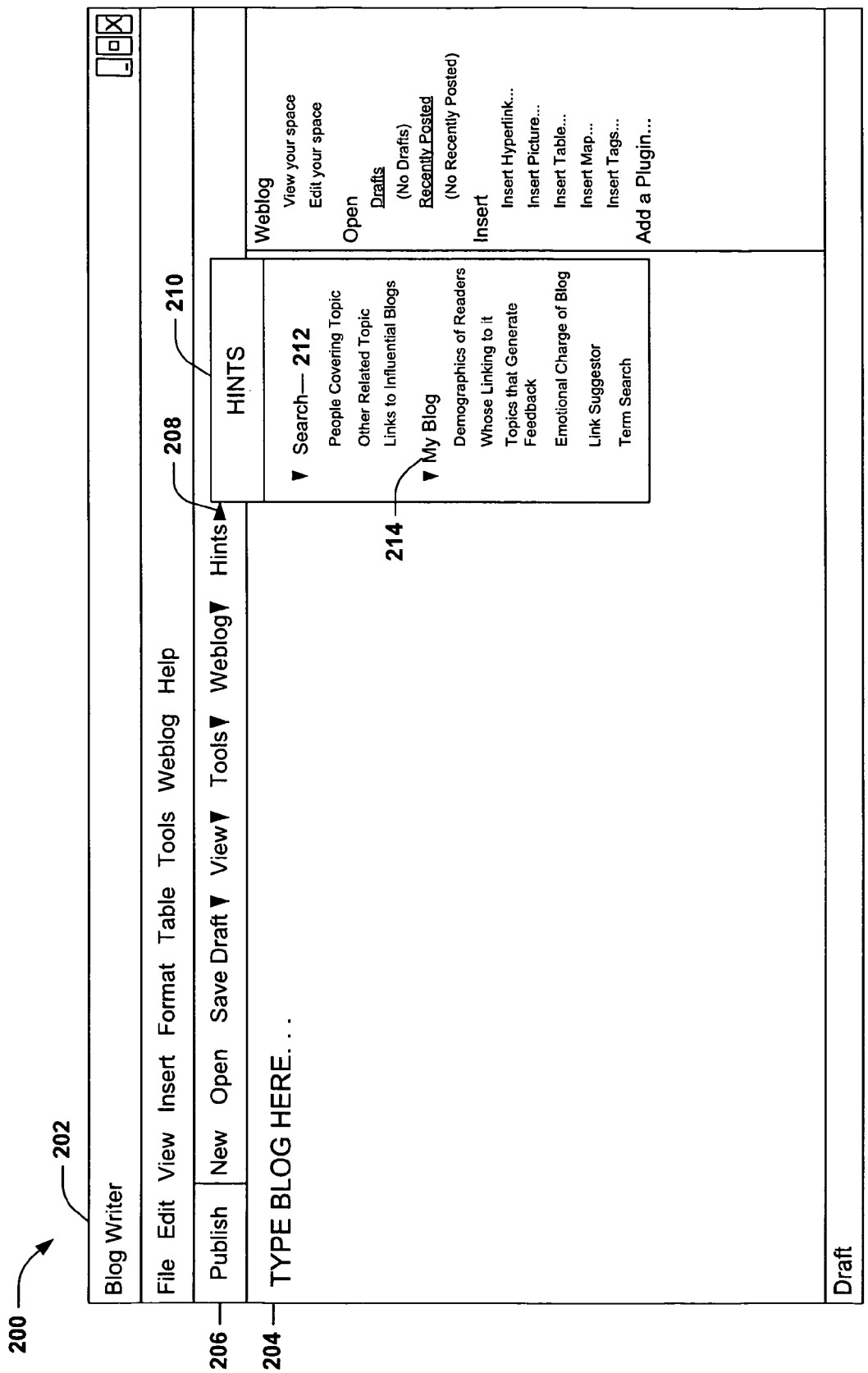
FIG. 2 is an exemplary environment for displaying hints to an author.

FIG. 2 illustrates an exemplary environment 200 for providing hints to an author that is creating content for social media. More particularly, FIG. 2 illustrates a social media authoring tool 202 that comprises a field for creating content 204 and a toolbar 206 configured to assisting the author in performing various functions. If the author wishes to display hints, the author may select an arrow 208 configured to expand a hints dropdown menu 210. From this menu, the author may input a search term into a search field 212, for example. The author may also be provided hints about his/her blog as a function of previous posts the author has created, for example, in social media. In the illustrated example, the author may expand the "My Blog" field 214 and information about his/her blog, such as the demographics of his/her readers, may be displayed. Additionally, the author may begin to type content in the field for creating content 204 and then expand the hints dropdown menu 210, causing hints related to the content typed to be provided to the author. It will be appreciated that other environments may also be used to provide hints to the author and/or different hints from those illustrated may be displayed. Hints may be displayed, for example, in social media content other than a blog editor. Additionally, the placement (e.g., side pane, popup window, separate on-screen window, dedicated area in a sidebar, etc.) of the hints may vary.

Figure 3:
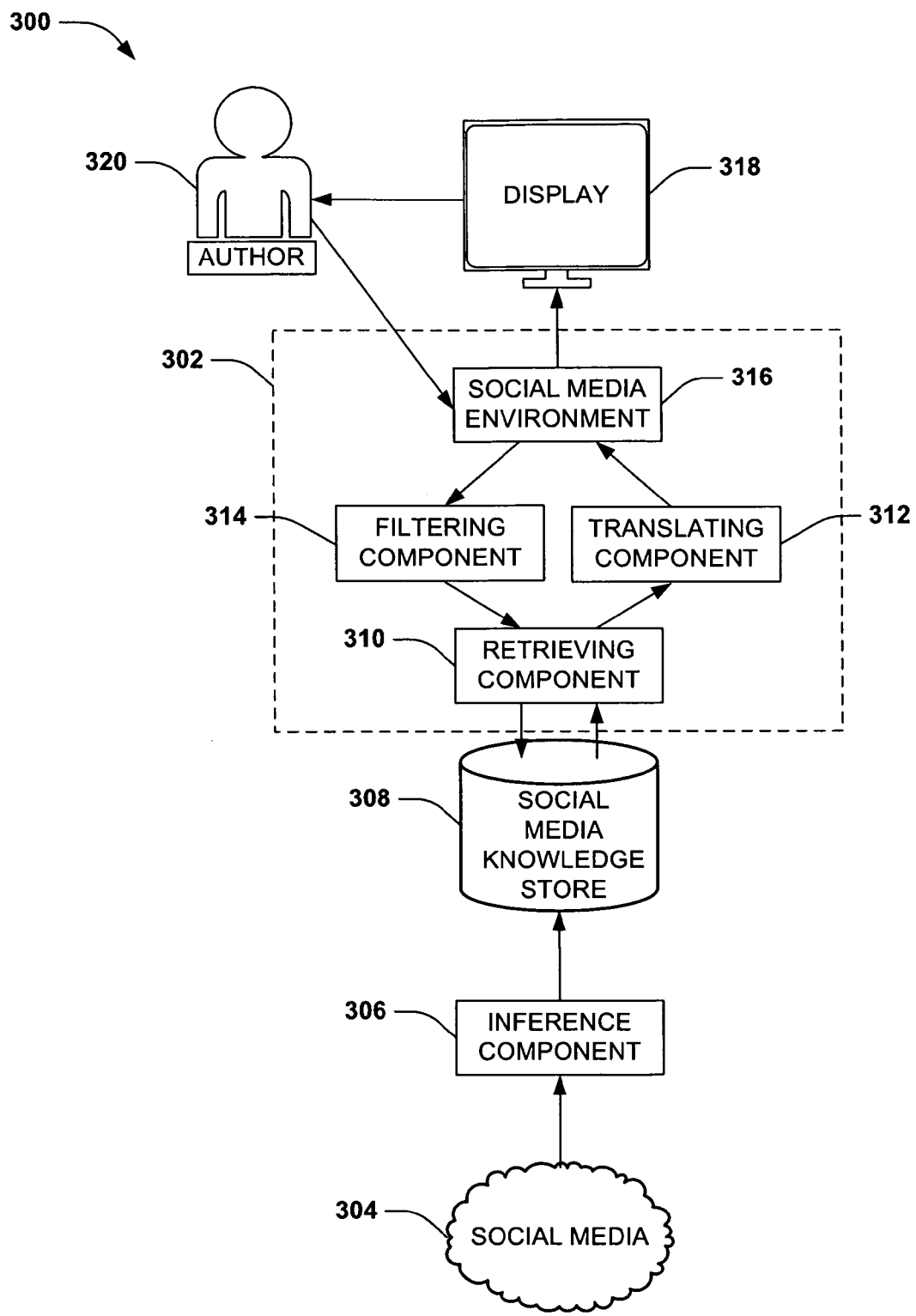
FIG. 3 is a component block diagram illustrating an exemplary system for assisting an author in creating content for social media.

FIG. 3 illustrates an exemplary environment 300 wherein a system 302 for assisting an author 320 in creating content for social media may be implemented. More particularly, the system 302 illustrates a retrieving component 310 configured to retrieve information from a social media knowledge store 308, a translating component 312 configured to translate the relevant information retrieved by the retrieving component 310 into hints, and a social media environment 316 configured to provide the hints to the author 320. The system 302, may also contain a filtering component 314 configured to receive editing context from the social media environment 316, wherein the social media environment 316 receives input from the author 320. It will be appreciated that the retrieving component 310 may also receive input directly from the social media environment 316.

The retrieving component 310 retrieves relevant information from the social media knowledge store 308. Editing context may be used to determine the relevancy of information in the social media knowledge store 308. In one example, the retrieving component 310 submits a query (e.g., a search with given parameters) to the social media knowledge store 308 as a function of terms (e.g., the editing context) received by the filtering component 314 and/or the social media environment 316. For example, the author may input the phrase "sailing in Cape Cod" into the social media environment 316 and the retrieving component 310 may use the phrase (as is and/or a modified phrase thereof if it is passed through a filtering component 314) to conduct a query of the social media knowledge store 308. In another example, the editing context provided by the author may include a link that points to an article. The filtering component 314 may submit the link to the retrieving component 310 and/or the filtering component 314 may use link extraction algorithms, for example, to extract keywords from the page pointed to by the link, and those keywords may be submitted to the retrieving component 310. Additionally, the relevancy of information may be a function of social media behavior. For example, the retrieving component 310 may retrieve posts written within the last twenty-four hours and/or previously written posts by the author 320.

In the example environment 300, the social media knowledge store 308 is configured to store social media 304, wherein raw data is acquired from social media 304. The inference component 306 adds knowledge and/or facts to the raw social media 304 acquired. The inference component 306, may add knowledge and/or facts, for example, based on keywords in a post, links in a post, the author of the post, and/or the demographics of the author of the post. It will be appreciated that the acts of populating the social media knowledge store 308 may be accomplished in different manners and are not intended to limit the scope of the appended claims. They are, thus, primarily included for illustrative purposes.

Once the retrieving component 310 has retrieved the relevant information, the translating component 312 translates the relevant information into informational hints. For example, if the author uses a term that is likely to trigger negative reaction, the translating component 312 may use the information retrieved to provide that author with a warning and/or suggest alternative terms to use as a function of the information retrieved (e.g., language in posts previously written by the author, language in posts written by other authors, reader feedback) In another example, the author covers a topic that has resonated with a particular demographic (based on the information retrieved) and the hints show the demographic details (e.g., 25-35 year old females from coastal states). In yet another example, the author inserts a link into a blog post he/she is creating and the translating component 312 uses the relevant information to provide the author with alternative links that other social media authors are using when covering similar topics. Additionally, the hints may provide the author with suggestions and/or corrections as a function of social media. For instance, if the author is writing about a Russian who has recently been in the news (and whose spelling is not in a standard dictionary found on desktop applications), a hint may be created that shows the author the correct spelling of the person (e.g., based on a majority of posts that also discuss that person).

The social media environment 316 is configured to provide the hints created by the translating component 312 to the author 320. The hints may assist the author 320 in creating social media content. Additionally, the social media environment 316 may be capable of receiving input from the author 320, such as searchable terms and/or the post being created. The input received may then be output to the filtering component 314 and/or the retrieving component 310. In one example, the social media environment 316 is a pre-existing authoring tool configured to assist the author 320 in creating post for social media. For example, the social media environment 316 may be configured similar to a word processor (e.g., capable of assisting the author 320 in inserting pictures into the post, saving the post until a later date, etc.) In that example, the system 302 may be plug-in/add-on that is added to the pre-existing social media environment 316. The social media environment 316 may be displayed to the author 320 through a display 318 (e.g., a monitor). It will be appreciated that the system 302 may also be implemented independently of pre-existing authoring tools and/or pre-existing social media environments.

Figure 4:
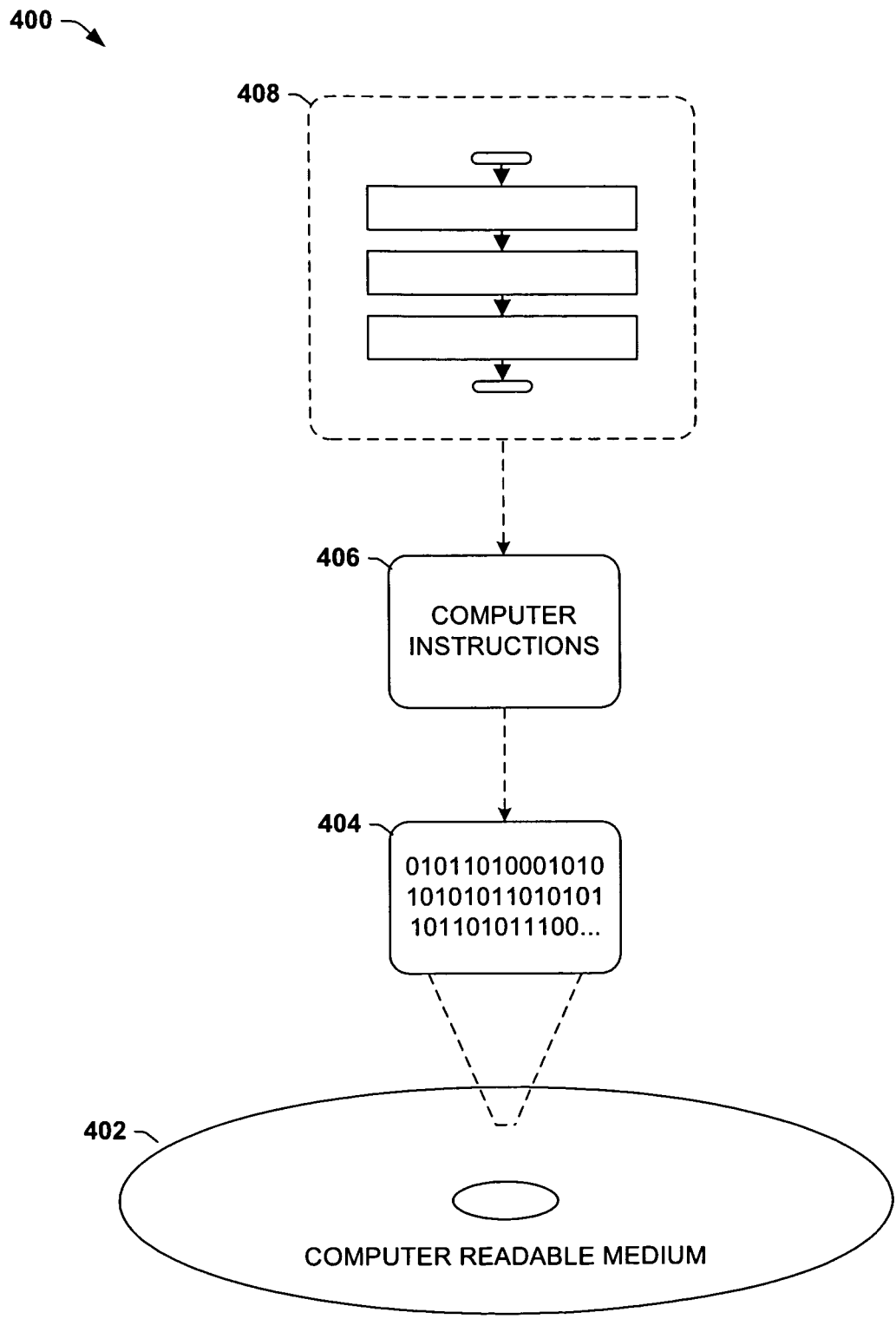
FIG. 4 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 4, wherein the implementation 400 comprises a computer-readable medium 402 (e.g., a CD-R, DVD-R, or a platter of a hard disk drive), on which is encoded computer-readable data 404. This computer-readable data 404 in turn comprises a set of computer instructions 406 configured to operate according to one or more of the principles set forth herein. In one such embodiment 400, the processor-executable instructions 406 may be configured to perform a method, such as the exemplary methods 100 of FIG. 1, for example. In another such embodiment, the processor-executable instructions 406 may be configured to implement a system, such as the exemplary system 302 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 5:
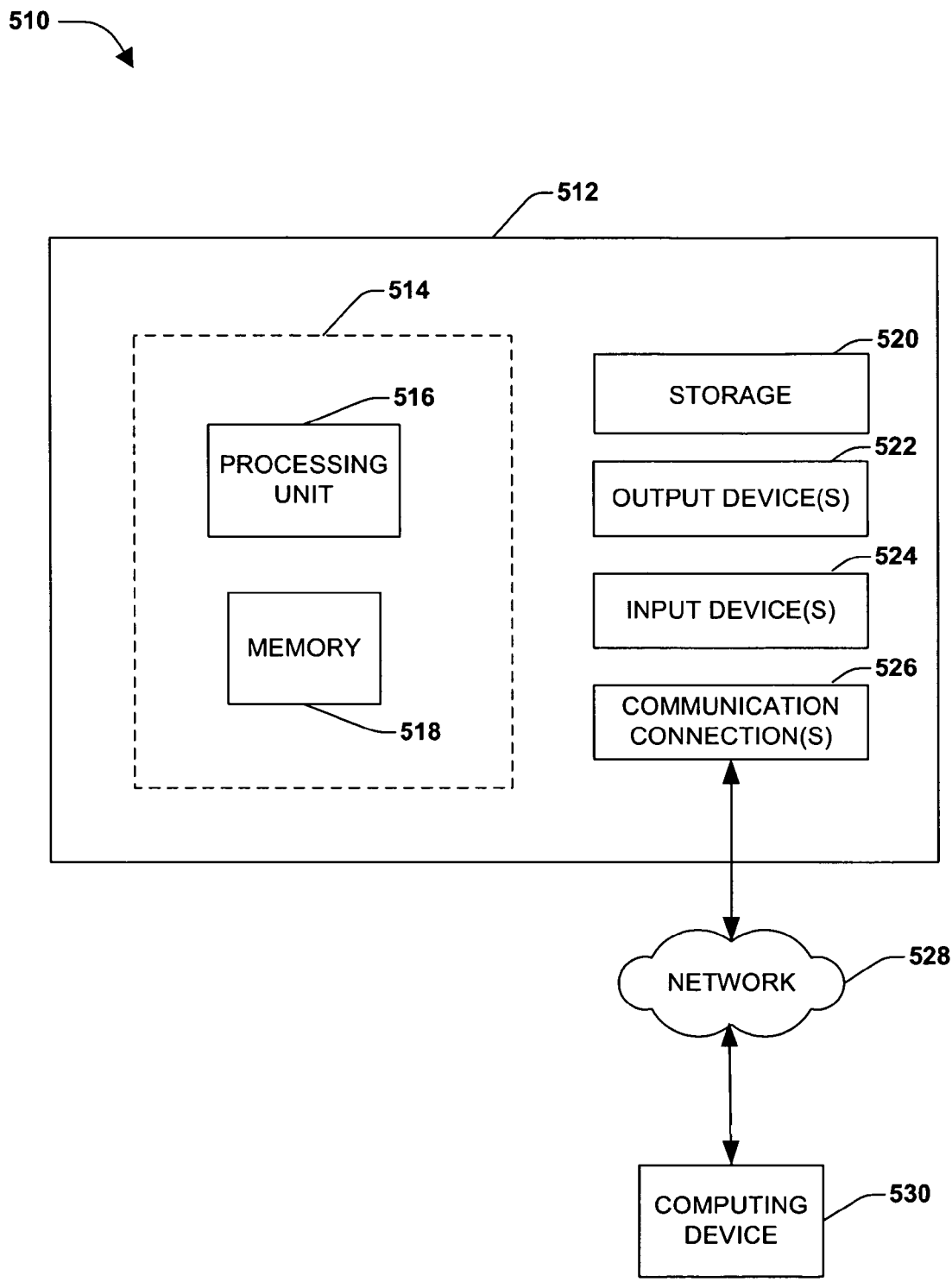
FIG. 5 illustrates an exemplary computing environment wherein one or more of the provisions set forth herein may be implemented.

FIG. 5 and the following discussion provide a brief, general description of a suitable computing environment to implement embodiments of one or more of the provisions set forth herein. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 illustrates an example of a system 510 comprising a computing device 512 configured to implement one or more embodiments provided herein. In one configuration, computing device 512 includes at least one processing unit 516 and memory 518. Depending on the exact configuration and type of computing device, memory 518 may be volatile (such as RAM, for example), non-volatile (such as ROM, flash memory, etc., for example) or some combination of the two. This configuration is illustrated in FIG. 5 by dashed line 514.

In other embodiments, device 512 may include additional features and/or functionality. For example, device 512 may also include additional storage (e.g., removable and/or non-removable) including, but not limited to, magnetic storage, optical storage, and the like. Such additional storage is illustrated in FIG. 5 by storage 520. In one embodiment, computer readable instructions to implement one or more embodiments provided herein may be in storage 520. Storage 520 may also store other computer readable instructions to implement an operating system, an application program, and the like. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 512. Any such computer storage media may be part of device 512.

Device 512 may also include communication connection(s) 526 that allows device 512 to communicate with other devices. Communication connection(s) 526 may include, but is not limited to, a modem, a Network Interface Card (NIC), an integrated network interface, a radio frequency transmitter/receiver, an infrared port, a USB connection, or other interfaces for connecting computing device 512 to other computing devices. Communication connection(s) 526 may include a wired connection or a wireless connection. Communication connection(s) 526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 512 may include input device(s) 524 such as keyboard, mouse, pen, voice input device, touch input device, infrared cameras, video input devices, and/or any other input device. Output device(s) 522 such as one or more displays, speakers, printers, and/or any other output device may also be included in device 512. Input device(s) 524 and output device(s) 522 may be connected to device 512 via a wired connection, wireless connection, or any combination thereof. In one embodiment, an input device or an output device from another computing device may be used as input device(s) 524 or output device(s) 522 for computing device 512.

Components of computing device 512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 512 may be interconnected by a network. For example, memory 518 may be comprised of multiple physical memory units located in different physical locations interconnected by a network.

Those skilled in the art will realize that storage devices utilized to store computer readable instructions may be distributed across a network. For example, a computing device 530 accessible via network 528 may store computer readable instructions to implement one or more embodiments provided herein. Computing device 512 may access computing device 530 and download a part or all of the computer readable instructions for execution. Alternatively, computing device 512 may download pieces of the computer readable instructions, as needed, or some instructions may be executed at computing device 512 and some at computing device 530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
   receiving one or more terms from a post that an author is authoring;
   determining a topic of the post based upon the one or more terms;
   identifying, from within a social media knowledge store, social media content corresponding to the topic;
   using the social media content to generate a set of one or more hints, wherein the set of one or more hints comprises:
     a description of at least one of: words, websites, images, quotes, topics, people, or places; and
     data indicating a type of emotional response and demographic information for the at least one of: words, websites, images, quotes, topics, people, or places, when included in previous social media posts relating to the topic; and
   providing, for display, the set of one or more hints to the author while the author is authoring the post.

2. The method of claim 1, the set of one or more hints further comprising demographic information about one or more readers of the previous social media posts.

3. The method of claim 1, the set of one or more hints comprising a link to a webpage related to the topic.

4. The method of claim 1, wherein the type of emotional response is a negative response from readers.

5. The method of claim 1, the set of one or more hints further describing a word commonly used in social media.

6. The method of claim 1, the determined topic comprising a target demographic and the set of one or more hints describing at least one of words, websites, images, quotes, topics, people, or places that, when included in posts relating to the topic, have elicited a positive response from readers in the target demographic.

7. The method of claim 1, the set of one or more hints further comprises a suggested modification to a term within the post.

8. The method of claim 1, the social media content comprising content previously posted to social media by the author.

9. The method of claim 8, the previous social media posts comprising comments relating to the content previously posted to social media by the author.

10. The method of claim 1, the post comprising a link to online content and the set of hints comprising an alternative link for the link.

11. A system comprising:
    one or more processing units; and
    memory comprising instructions that when executed by at least one of the one or more processing units perform operations, comprising:
      receiving one or more terms from a post that an author is authoring;
      determining a topic of the post based upon the one or more terms;
      identifying, from within a social media knowledge store, social media content corresponding to the topic;
      using the social media content to generate a set of one or more hints, wherein the set of hints comprises:
        a description of at least one of: words, websites, images, quotes, topics, people, or places; and
        data indicating a type of emotional response and demographic information for the at least one of: words, websites, images, quotes, topics, people, or places, when included in previous social media posts relating to the topic; and
      providing, for display, the set of one or more hints to the author while the author is authoring the post.

12. The system of claim 11, the previous social media posts comprising comments relating to content previously posted to social media by the author.

13. A computer readable storage device comprising computer executable instructions that when executed via a processing unit perform a method comprising:
    receiving one or more terms from a post being authored;
    determining a topic of the post based upon the one or more terms;
    identifying, from within a social media knowledge store, social media content about the topic;
    based on the social media content, generating a set of one or more hints for the topic, wherein the set of one or more hints comprises:
      data indicating a first type of emotional response and demographic information for at least one of: words, websites, images, quotes, topics, people, or places, when included in previous social media posts relating to the first topic; and
    providing, for display, the first set of one or more hints to the author.

14. The computer readable storage device of claim 13, wherein the type of emotional response is a negative response from readers.

15. The computer readable storage device of claim 13, wherein demographic information includes age information.

16. The computer readable storage device of claim 13, the set of one or more hints further describing a suggested modification to a term within the post.

17. The computer readable storage device of claim 13, the post comprising a link to online content and the set of hints further comprising an alternative link for the link.

18. The computer readable storage device of claim 13, wherein the method further comprises receiving a target demographic and the identifying comprising identifying the social media content based upon the target demographic.

19. The computer readable storage device of claim 13, the first set of one or more hints further comprising a link to a webpage related to the topic.

20. The computer readable storage device of claim 13, the previous social media posts comprising content previously posted to social media by the author.

\* \* \* \* \*